United States Patent
Uwazumi et al.

(10) Patent No.: US 7,622,205 B2
(45) Date of Patent: Nov. 24, 2009

(54) DISK SUBSTRATE FOR A PERPENDICULAR MAGNETIC RECORDING MEDIUM AND A PERPENDICULAR MAGNETIC RECORDING MEDIUM USING THE SUBSTRATE

(75) Inventors: Hiroyuki Uwazumi, Nagano (JP); Youichi Tei, Nagano (JP); Kengo Kainuma, Nagano (JP); Kazuhito Higuchi, Nagano (JP); Akira Iso, Nagano (JP); Hajime Kurihara, Nagano (JP)

(73) Assignee: Fuji Electric Device Technology Co. Ltd. (JP)

( * ) Notice: Subject to any disclaimer, the term of this patent is extended or adjusted under 35 U.S.C. 154(b) by 484 days.

(21) Appl. No.: 11/104,274

(22) Filed: Apr. 12, 2005

(65) Prior Publication Data

US 2005/0238929 A1    Oct. 27, 2005

(30) Foreign Application Priority Data

Apr. 16, 2004  (JP)  ............................ 2004-121889
Oct. 25, 2004  (JP)  ............................ 2004-309723

(51) Int. Cl.
  *G11B 5/64*  (2006.01)
  *G11B 5/00*  (2006.01)
  *G11B 15/70*  (2006.01)
(52) U.S. Cl. .................. 428/832.1; 428/832; 360/135
(58) Field of Classification Search .............. 428/836, 428/830, 846.9, 832.2, 832.1, 832.3, 832.4; 360/99.07, 99.08, 125.39, 324.2, 119.1, 135, 360/9.07, 119.19; 438/3; 216/22
See application file for complete search history.

(56) References Cited

U.S. PATENT DOCUMENTS

| 3,523,823 | A |   | 8/1970  | Kefalas |
| 4,804,410 | A |   | 2/1989  | Haga et al. |
| 4,894,742 | A | * | 1/1990  | Saito et al. ............. 360/125.39 |
| 5,145,555 | A | * | 9/1992  | Yamamoto ................... 216/22 |
| 5,264,981 | A | * | 11/1993 | Campbell et al. ...... 360/125.45 |
| 5,537,278 | A | * | 7/1996  | Yaegashi et al. ......... 360/119.1 |
| 6,127,052 | A |   | 10/2000 | Tomari et al. |

(Continued)

FOREIGN PATENT DOCUMENTS

GB        1169657       11/1969

(Continued)

OTHER PUBLICATIONS

JA 2000-082211 machine translation.*

(Continued)

*Primary Examiner*—D. Lawrence Tarazano
*Assistant Examiner*—Louis Falasco
(74) *Attorney, Agent, or Firm*—Rossi, Kimms & McDowell LLP (57) ABSTRACT

A disk substrate for a perpendicular magnetic recording medium is, disclosed. The substrate exhibits sufficient productivity, serves the function of a soft magnetic backing layer of the perpendicular magnetic recording medium, and scarcely generates noise. A perpendicular magnetic recording medium using such a substrate also is disclosed. The disk substrate comprises at least a soft magnetic underlayer formed on a nonmagnetic base plate by means of an electroless plating method. The thermal expansion coefficient of the soft magnetic underlayer is larger than a thermal expansion coefficient of the nonmagnetic disk-shaped base plate. A saturation magnetostriction constant $\lambda s$ satisfies a relation $\lambda s \geq -1 \times 10^{-5}$.

6 Claims, 8 Drawing Sheets

U.S. PATENT DOCUMENTS

| | | | |
|---|---|---|---|
| 6,156,413 A | | 12/2000 | Tomari et al. |
| 6,430,001 B1 * | | 8/2002 | Chainer et al. ............ 360/99.08 |
| 6,737,281 B1 * | | 5/2004 | Dang et al. ..................... 438/3 |
| 6,842,317 B2 * | | 1/2005 | Sugita et al. ............. 360/324.2 |
| 6,926,977 B2 | | 8/2005 | Osawa et al. |
| 2002/0192379 A1 | | 12/2002 | Imori |
| 2003/0150144 A1 * | | 8/2003 | Skapyak et al. ............... 40/310 |
| 2003/0190812 A1 | | 10/2003 | Padhi et al. |
| 2003/0235714 A1 * | | 12/2003 | Koda et al. .................. 428/830 |
| 2004/0265641 A1 | | 12/2004 | Ishii et al. |
| 2005/0053844 A1 * | | 3/2005 | Wu ................................ 430/5 |
| 2005/0191525 A1 * | | 9/2005 | Tsumori et al. ............. 428/836 |
| 2005/0287304 A1 | | 12/2005 | Iso et al. |
| 2006/0024431 A1 | | 2/2006 | Tei et al. |
| 2006/0134325 A1 | | 6/2006 | Iso et al. |
| 2006/0182881 A1 | | 8/2006 | Montano et al. |
| 2006/0210837 A1 | | 9/2006 | Kurihara et al. |
| 2006/0228493 A1 | | 10/2006 | Iso et al. |

FOREIGN PATENT DOCUMENTS

| | | | |
|---|---|---|---|
| GB | 1324653 | | 7/1973 |
| IE | 040060 | | 9/2004 |
| IE | 20050117 | | 11/2005 |
| JP | 48-85614 | | 11/1973 |
| JP | 53-19932 | | 2/1978 |
| JP | 58-91 | B2 | 1/1983 |
| JP | 61-034722 | | 2/1986 |
| JP | 62-092229 | | 4/1987 |
| JP | 62-121924 | | 6/1987 |
| JP | 62-223812 | | 10/1987 |
| JP | 01-176079 | A | 7/1989 |
| JP | 2-18710 | A | 1/1990 |
| JP | 5-1384 | A | 1/1993 |
| JP | 05-274641 | | 10/1993 |
| JP | 7-66034 | A | 3/1995 |
| JP | 07-334841 | A | 12/1995 |
| JP | 8-39728 | A | 2/1996 |
| JP | 10-226539 | A | 8/1998 |
| JP | 2000-082211 | A | 3/2000 |
| JP | 2000-163743 | A | 6/2000 |
| JP | 2001-189006 | | 7/2001 |
| JP | 2002-220259 | A | 8/2002 |
| JP | 2000-163743 | A | 6/2006 |

OTHER PUBLICATIONS

JA 2000-163743 machine translation.*

Asahi, T., et al. "Novel Soft Magnetic Underlayers for Double-layered Perpendicular Magnetic Recording Media: Electroless-Deposited Films of CoNiFe-based Alloy," (Cont) (cont.) Digest of 9th Joint MMM/Intermag Conference, EP-12, p. 259 (2004).

Uwazumi, H. et al., "Recording Performance of the Perpendicular Recording Media with Electroless-Plated Ni-P Soft Magnetic Underlayer," Digest of 9th Joint MMM/Intermag . . . (cont.) Conference GD-13, p. 368 (2004).

Saito, S. et al, "Single-Domain and Magnetic Properties of a Soft Magnetic Underlayer Plated on an Al/NiP Disk," J of the Magnetics Society of JP, vol. 28, No. 3, p. 289 (2004).

Irish Search Report issued for corresponding foreign Patent Application No. 2005/0198; mailing date of Jul. 11, 2007.

Related co-pending U.S. Appl. No. 11/374,669 Hajime Kurihara et al.; Method of Plating on a Glass Base Plate, a Method of Manufacturing a Disk Substrate for a Perpendicular (cont.) Magnetic Recording Medium, a Disk Substrate for a Perpendicular Magnetic Recording Medium, and a Perpendicular Magnetic Recording Medium; Spec. pp. 1-35; Figs. 1-5 No Publication Date Availabe.

Related co-pending U.S. Appl. No. 11/374,374 Akira ISO et al.; Method of Plating on a Glass Base Plate and a Method of Manufacturing a Perpendicular Magnetic Recording Medium; Spec. pp. 1-20; Figs. 1-5 No Publication Date Available.

Japanese Official Action dated Aug. 4, 2009 for Japanese Application No. 2004-309723.

* cited by examiner

DISK SUBSTRATE FOR A PERPENDICULAR MAGNETIC RECORDING MEDIUM AND A PERPENDICULAR MAGNETIC RECORDING MEDIUM USING THE SUBSTRATE

CROSS REFERENCE TO RELATED APPLICATIONS

This application is based on, and claims priority to, Japanese Application No. 2004-121889, filed on Apr. 16, 2004, and Japanese Application No. 2004-309723, filed on Oct. 25, 2004, the contents of which are incorporated herein by reference.

BACKGROUND OF THE INVENTION

A. Field of the Invention

The present invention relates to a disk substrate for a perpendicular magnetic recording medium and a perpendicular magnetic recording medium mounted on an external storage device of a computer and other magnetic recording devices, in particular to a perpendicular magnetic recording medium suited for mounting on a hard disk drive (HDD), and a disk substrate for such a perpendicular magnetic recording medium.

B. Description of the Related Art

A perpendicular magnetic recording system is drawing attention as a technique to achieve high density magnetic recording, in place of a conventional longitudinal magnetic recording system. In particular, a double layer perpendicular magnetic recording medium is known to be suited as a perpendicular magnetic recording medium for achieving high density recording, as disclosed in Japanese Patent Publication No. S58-91. A double layer perpendicular magnetic recording medium is provided with a soft magnetic film called a soft magnetic backing layer under a magnetic recording layer that stores information. The soft magnetic backing layer, exhibiting high saturation magnetic flux density Bs, facilitates passage of the magnetic flux generated by a magnetic head. The double layer perpendicular magnetic recording medium increases intensity and gradient of the magnetic field generated by the magnetic head to improve recording resolution, and also increases the leakage flux from the medium.

The soft magnetic backing layer generally uses a Ni—Fe alloy film, an Fe—Si—Al alloy film, or an amorphous alloy film of mainly cobalt having a thickness in a range of about 200 nm to 500 nm formed by a sputtering method. To form such a relatively thick film by a sputtering method is not appropriate from the viewpoint of production costs and mass productivity. To solve the problem, use of a soft magnetic film formed by an electroless plating method has been proposed for the soft magnetic backing layer. Japanese Unexamined Patent Application Publication No. H7-66034, for example, proposes a soft magnetic backing layer using a NiFeP film produced by a plating method on an aluminum alloy disk substrate provided with a nonmagnetic NiP plating film. A CoNiFeP plating film formed on a glass substrate has been proposed (Digest of 9th Joint MMM/Intermag Conference, EP-12, p. 259 (2004)), as has a soft magnetic NiP plating film formed on an aluminum alloy disk substrate provided with a nonmagnetic NiP plating film (Digest of 9th Joint MMM/Intermag Conference, GD-13, p. 368 (2004)).

It is known that if the soft magnetic backing layer forms a magnetic domain structure and generates a magnetization transition region called a magnetic domain wall, the noise called spike noise generated from the magnetic domain wall degrades the performance of the perpendicular magnetic recording medium. Therefore, it is necessary to suppress of formation of the magnetic domain wall in a soft magnetic backing layer.

Since the NiFeP plating film is apt to form a magnetic domain wall, J. of The Magnetics Society of Japan, vol. 28, No. 3, p. 289-294 (2004) discloses that the magnetic domain wall formation must be suppressed by forming a MnIr alloy thin film on the plating film by a sputtering method. The suppression of the magnetic domain wall formation in the above-mentioned CoNiFeP plating film is described to be possible by conducting the plating process in a magnetic field. The soft magnetic NiP plating film is deemed not to generate spike noise.

Japanese Unexamined Patent Application Publication No. H2-18710 also proposes that the generation of spike noise can be suppressed by forming a backing layer composed of cobalt or a CoNi alloy having coercivity Hc in a range of 30 to 300 Oe in such a way as to exhibit magnetic anisotropy in the circumferential direction of the disk substrate. While the backing layer in this example is formed by a dry deposition process such as a sputtering method or an evaporation method, Japanese Unexamined Patent Application Publication No. H5-1384 proposes a method to form a Co—B film having Hc of at least 30 Oe and suppressing spike noise by a plating method, and suggests applicability to a soft magnetic backing layer.

For a disk substrate of a magnetic recording medium mounted on a hard disk drive, a glass disk substrate using crystallized glass or chemically reinforced glass is used as well as an aluminum alloy substrate provided with a nonmagnetic NiP plating film. The glass substrates, having high strength, are mainly used in a magnetic recording medium of a portable hard disk drive, which needs high chock resistance. The above-described plating method for forming a soft magnetic layer is effective to improve the productivity also in a glass disk substrate for a perpendicular magnetic recording medium.

The present inventors have discovered that the provision of the above-mentioned soft magnetic NiP plating film on a glass disk substrate is apt to orient the magnetization of the NiP plating film in the direction perpendicular to the film surface, generating very large noise, thus preventing the use of the soft magnetic NiP plating film for a soft magnetic backing layer. The same material of the NiP plating film can exhibit quite different magnetic properties and noise characteristics when used on an aluminum alloy disk substrate as opposed to the case where it is used on a glass disk substrate. Therefore, selection of a material used as a soft magnetic baking layer on a glass disk substrate is necessarily different from selection of a material used on an aluminum alloy disk substrate.

To suppress spike noise in the NiFeP plating film described previously, the magnetic domain wall formation needs to be suppressed by forming a MnIr alloy thin film on the plating film by a sputtering method. The requirement for provision of an additional film by a sputtering method to suppress the magnetic domain wall formation detracts from the merit of the plating method in production costs and mass productivity, and therefore is undesirable.

With the CoNiFeP plating film described above, it is difficult to apply a homogeneous magnetic field to the substrate in the plating bath in an actual manufacturing process, and is also very likely to impair the mass productivity. Although an iron-containing plating film, exhibiting high Bs, is suitable for a soft magnetic backing layer, ensuring the stability of a plating bath is known to be generally difficult because iron ions takes stable forms of both divalent and trivalent ions. So the iron-containing plating film is also defective in mass productivity.

The inventors have studied the correlation between coercivity and magnetic domain wall formation of the soft magnetic underlayer formed by a plating method, and found that a coercivity value of the plating film of not smaller than 30 Oe cannot completely prevent the magnetic domain wall formation, although some tendency of suppression was observed. It has been further determined that the increase of the coercivity deteriorates the read-write performance.

μs described above, the conventional technology does not achieve a backing layer on a glass disk substrate of a perpendicular magnetic recording medium that allows high density recording and suppresses spike noise while still being accompanied by low production costs and satisfactory mass productivity.

The present invention is directed to overcoming or at least reducing the effects of one or more of the problems set forth above.

SUMMARY OF THE INVENTION

It is therefore an object of the present invention to provide a substrate for a perpendicular magnetic recording medium, the substrate allowing mass production, serving a function as a soft magnetic backing layer of a perpendicular magnetic recording medium, and scarcely generating noise. Another object of the invention is to provide a perpendicular magnetic recording medium using such a substrate.

The inventors have made extensive studies to solve the problems noted above and have found that a disk substrate for a perpendicular magnetic recording medium allowing mass production, serving a function as a soft magnetic backing layer of a perpendicular magnetic recording medium, and scarcely generating noise can be achieved by the combination of a nonmagnetic disk-shaped base plate and a soft magnetic underlayer such that a thermal expansion coefficient of the soft magnetic underlayer is larger than a thermal expansion coefficient of the nonmagnetic disk-shaped base plate and a saturation magnetostriction constant $\lambda s$ satisfies a relation $\lambda s \geq -1 \times 10^{-5}$.

Thermal expansion coefficient is a material property that changes with the temperature range of measurement. The temperature range of measurement of the thermal expansion coefficient referred to in the present invention is approximately the range from 20° C. to 200° C. in view of the temperature range of operation of the disk substrate for a magnetic recording medium.

The electroless plating is generally conducted in a plating bath at a temperature not lower than 80° C. If the thermal expansion coefficients of the nonmagnetic disk-shaped base plate and the plated film differ too much, stress develops in the plated film while it is cooled to room temperature after completion of the plating step. It is known that magnetic anisotropy is induced in the plating film depending on the magnitude and direction of the stress (compression or tension) and the quantity of the saturation magnetostriction of the formed plating film. When the disk-shaped base plate is composed of strengthened glass or crystallized glass (both exhibiting thermal expansion coefficient not larger than $10 \times 10^{-6}/°$ C.) and the plating film is composed of Co, Ni, Fe, or an alloy of these elements (each exhibiting thermal expansion coefficient of about $12 \times 10^{-6}/°$ C. or larger), for example, tensile stress develops in the film plane direction after it is cooled to room temperature after completion of the plating step. In this case, if the saturation magnetostriction constant of the plating film is negative and the absolute value is large, the magnetic anisotropy with an axis of easy magnetization perpendicular to the film surface is induced in the plating film and the magnetization tends to align perpendicularly to the film surface.

According to the studies by the inventors, in order to suppress generation of large noise due to the tendency of magnetization alignment perpendicularly to the film surface, the combination of the nonmagnetic disc-shaped base plate and the soft magnetic underlayer must satisfy the relation between the thermal expansion coefficients of the two members and the value of the saturation magnetostriction as described above.

The nonmagnetic disk base plate preferably is composed of chemically reinforced glass or crystallized glass, which is used in nonmagnetic disk substrates of conventional hard disks. In addition, silicon, which exhibits a relatively small thermal expansion coefficient, can also be used for a nonmagnetic disk base plate.

Advantageously, the soft magnetic underlayer is formed by an electroless plating method and composed of a Co—Ni—P alloy that contains phosphorus in the range of 3 at % to 20 at % and cobalt at least 45% in proportion to the number of atoms of cobalt and nickel (Co/(Co+Ni)). The thickness of the soft magnetic underlayer is preferably in the range of 0.2 μm to 3 μm.

Advantageously, the plating layer of the Co—Ni—P alloy contains at most 2 at % of tungsten or manganese. The inclusion of the element does not deteriorate the function as a soft magnetic backing layer, and it improves the corrosion resistance. Further, addition of germanium or lead of at most several percent for the purpose of stabilizing the plating bath does not detract from advantages of the present invention.

To obtain the function as a soft magnetic backing layer of a perpendicular magnetic recording medium that allows high density recording, the thickness of the soft magnetic underlayer is necessarily at least 0.2 μm, and the thickness is preferably at most 3 μm in view of productivity.

Concerning composition of the soft magnetic underlayer, a phosphorus concentration below 3 at % hardly allows a stable electroless plating film to be formed, while a phosphorus concentration over 20 at % results in a Bs value that is too low, and the function as a soft magnetic backing layer is not achieved.

A cobalt concentration lower than 45 at % in proportion to the number of atoms of cobalt and nickel (Co/(Co+Ni)) is not appropriate since the Bs value cannot be maintained sufficiently high and the saturation magnetostriction constant becomes a negative and large absolute value. Although an upper limit of the cobalt concentration is not strictly limited to a special value, a cobalt concentration over 90 at % in proportion to the number of atoms of cobalt and nickel (Co/(Co+Ni)) tends to make the CoNi alloy take an hcp structure having a large crystalline magnetic anisotropy constant and to increase coercivity, and thus is unfavorable. The composition preferably contains at least 10 at % of nickel in proportion to the number of atoms of cobalt and nickel (Ni/(Co+Ni)) to stably form an fcc structure.

The effects of the present invention are also achieved when an adhesion layer is provided between the nonmagnetic disk base plate and the soft magnetic underlayer to improve adhesivity between the two. A heating process may be carried out after formation of the soft magnetic underlayer, although the desired performance can be obtained without the heating process in the plating film of the invention. The heating process scarcely deteriorates the magnetic. performances and noise characteristics of the soft magnetic underlayer due to magnetic anisotropy induced by the thermal expansion difference between the nonmagnetic disk base plate and the soft magnetic underlayer, as long as the relation between the thermal expansion coefficients of the base plate and the underlayer and the saturation magnetostriction constant of the underlayer are maintained as described above.

The inventors of the present invention have made extensive studies on the suppression of the magnetic domain wall formation in the soft magnetic underlayer of the CoNiP plating and found that a ratio Mrrδ/Mrcδ needs to be controlled in a range of 0.33 to 3.00, where Mrcδ is a product of thickness and residual magnetization obtained from a magnetization curve measured by applying a magnetic field along a circumferential direction of the disk substrate, and Mrrδ is a product of thickness and residual magnetization obtained from a magnetization curve measured by applying a magnetic field along a radial direction of the disk substrate. The magnetization tends to align along the circumferential direction of the disk substrate if Mrrδ/Mrcδ is smaller than 0.33, and tends to align along the radial direction of the disk if Mrrδ/Mrcδ is larger than 3.00. µs a result, the magnetic domain walls are liable to be formed along the respective directions, generating undesirable spike noise.

The inventors have also found that the Hc value does not strongly correlate to the magnetic domain wall formation, and the read-write performance improves with the Hc value of not larger than about 20 Oe rather than with the Hc value of at least 30 Oe that is taught by Japanese Unexamined Patent Application Publication No. H2-18710 and Japanese Unexamined Patent Application Publication No. H5-1384.

A perpendicular magnetic recording medium of the invention uses the above-described disk substrate for a perpendicular magnetic recording medium according to the invention and comprises at least a nonmagnetic seed layer, a magnetic recording layer, and a protective layer sequentially formed on the substrate. According to the study by the inventors, such a perpendicular magnetic recording medium exhibits favorable recording and reproduction performance as a double layer perpendicular magnetic recording medium since the soft magnetic underlayer on the uppermost surface of the disk substrate functions as a soft magnetic backing layer. In addition, the soft magnetic backing layer is formed by means of an electroless plating method that is conducted with high mass productivity. Therefore, the medium is manufactured very inexpensively because the backing layer need not be formed by a sputtering method, for example.

Advantageously, a soft magnetic auxiliary layer that exhibits a product of thickness and saturation magnetic flux density of at least 150 G µm and the thickness of at most 50 nm is provided between the soft magnetic underlayer on the uppermost surface of the disk substrate and the nonmagnetic seed layer. Because both this soft magnetic auxiliary layer and the soft magnetic underlayer work as a soft magnetic backing layer, the function for a double layer perpendicular magnetic recording medium improves and random noise generated in the soft magnetic underlayer is suppressed.

The soft magnetic auxiliary layer preferably has a product of thickness and saturation magnetic flux density of at least 150 G µm to improve the function as a soft magnetic backing layer. The thickness is preferably at most 50 nm, because a thickness larger than 50 nm is liable to form magnetic domain walls in the soft magnetic auxiliary layer and generates spike noise, and further, to deteriorate productivity.

According to the present invention, a disk substrate for a perpendicular magnetic recording medium is provided that allows mass production, serves a function as a soft magnetic backing layer of a perpendicular magnetic recording medium, and scarcely generates noise using strengthened glass, crystallized glass, or silicon or the like for the nonmagnetic disk base plate.

A perpendicular magnetic recording medium of the invention, using a substrate for a perpendicular magnetic recording medium of the invention, achieves favorable read-write performance. Because the soft magnetic backing layer in the medium of the invention is formed by an electroless plating method that allows mass production, a relatively thick film required for a soft magnetic backing layer need not be formed by, for example, a sputtering method, permitting very inexpensive production.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
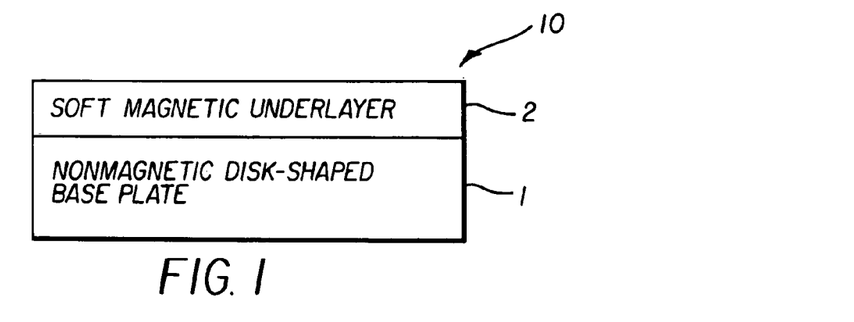
FIG. 1 is a schematic sectional view of a structure of a disk substrate for a perpendicular magnetic recording medium of an embodiment according to the invention.

Embodiment of a substrate. FIG. 1 shows a structure of a disk substrate for a perpendicular magnetic recording medium of an embodiment of the invention. Disk substrate 10 for a perpendicular magnetic recording medium of the embodiment shown in FIG. 1 comprises nonmagnetic disk-shaped base plate 1 and soft magnetic underlayer 2 on the base plate. Soft magnetic underlayer 2 may be formed on the other side of nonmagnetic disk-shaped base plate 1, although this is not shown in FIG. 1.

Nonmagnetic disk-shaped base plate 1 is necessarily composed of a material exhibiting a thermal expansion coefficient smaller than the thermal expansion coefficient of soft magnetic underlayer 2. The thermal expansion coefficient of the soft magnetic underlayer, when made mainly of a CoNi alloy, is larger than about $12 \times 10^{-6}/°$ C. So nonmagnetic disk-shaped base plate 1 can be favorably composed of crystallized glass, strengthened glass, or silicon or the like.

Soft magnetic underlayer 2 is necessarily composed of a material exhibiting a thermal expansion coefficient larger than the thermal expansion coefficient of nonmagnetic disk-shaped base plate 1 and a saturation magnetostriction constant $\lambda s$ that satisfies the relation $\lambda s \geq -\times 10^{-5}$. A material exhibiting a saturation magnetostriction $\lambda s$ smaller than $-1 \times 10^{-5}$, which means a negative and large absolute value, is inadequate for a disk substrate for a perpendicular magnetic recording medium because magnetic anisotropy perpendicular to the film surface occurs due to the tensile stress developed in the plating film, generating large noise.

Measurement of the saturation magnetostriction constant $\lambda s$ can be made, for example, by the following method. For example, a float glass substrate of a rectangular strip with dimensions 20 mm×5 mm×0.12 mm thick having a known Young's modulus E is prepared and a plating film is formed on one surface of the substrate. One end of the strip is fixed and a magnetic field is applied in parallel to the plane of the strip while rotating. The deflection of the substrate is measured through the displacement of a reflected laser light illuminating the end of the substrate opposite to the fixed end. The saturation magnetostriction constant $\lambda s$ can be calculated from the change of the amounts of deflection due to the magnetic fields applied along the major axis and the minor axis of the strip (a cantilever method).

Soft magnetic underlayer 2 is preferably composed of a Co—Ni—P alloy formed by an electroless plating method, and has a film thickness in the range of 0.2 µm to 3 µm. To obtain the function as a soft magnetic backing layer of a perpendicular magnetic recording medium that allows high density recording, the thickness of the soft magnetic underlayer needs to be at least 0.2 µm, while the thickness is preferably at most 3 µm in view of productivity.

Concerning the composition of the soft magnetic underlayer, a phosphorus concentration below 3 at % hardly allows forming a stable electroless plating film, while a phosphorus concentration over 20 at % results in a Bs value that is too low, and the layer cannot function as a soft magnetic backing layer. A cobalt concentration lower than 45 at % in proportion to the number of atoms of cobalt and nickel (Co/(Co+Ni)) is not appropriate since the Bs value cannot be maintained sufficiently high and the saturation magnetostriction constant becomes a negative and large absolute value. Although an upper limit of the cobalt concentration is not strictly limited to a special value, a cobalt concentration over 90 at % in proportion to the number of atoms of cobalt and nickel (Co/(Co+Ni)) tends to make the CoNi alloy take an hcp structure having a large crystalline magnetic anisotropy constant and to increase coercivity, and is therefore unfavorable. The composition preferably contains at least 10 at % of nickel in proportion to the number of atoms of cobalt and nickel (Ni/(Co+Ni)) to stably form an fcc structure.

Advantageously, the plating layer of the Co—Ni—P alloy contains at most 2 at % of tungsten or manganese. The inclusion of this element does not deteriorate the function as a soft magnetic backing layer and it improves the corrosion resistance. Further, addition of germanium or lead of at most several percent for the purpose of stabilizing the plating bath does not detract from the advantages of the present invention.

The plating films of a Co—Ni—P alloy, a Co—Ni—W—P alloy, and a Co—Ni—Mn—P alloy as described above can be formed by means of a known method of a so-called kanigen plating method using a reducing agent of sodium hypophosphite, and controlling the composition, temperature, and pH of the plating bath appropriately. In order to secure adhesion between the nonmagnetic disk-shaped base plate and the plating film and to promote the initial plating reaction, it is effective to conduct a pretreatment on the nonmagnetic disk base plate prior to the electroless plating step. The pretreatment can be carried out by dipping the base plate in a silane coupling agent solution (for example, 3-aminopropyl ethoxysilane) and then, dipping in palladium chloride solution. The effects of the invention also are obtained when an adhesion layer composed of a nonmagnetic NiP film, for example, is provided between the nonmagnetic disk base plate and the soft magnetic underlayer for improving the adhesivity.

A heating process may be carried out after formation of the soft magnetic underlayer, although the desired performance can be obtained without the heating process in the plating film of the invention. The heating process scarcely deteriorates the magnetic performances and noise characteristics of the soft magnetic underlayer due to magnetic anisotropy induced by the thermal expansion difference between the nonmagnetic disk base plate and the soft magnetic underlayer, as long as the relation between the thermal expansion coefficients of the base plate and the underlayer, and the saturation magnetostriction constant of the underlayer are maintained as described above.

After forming the soft magnetic underlayer by an electroless plating method or after the heating process described above, a polishing process may be conducted to smoothe the surface of the soft magnetic underlayer. The surface of the soft magnetic underlayer is effectively polished and smoothed using free abrasive. The polishing can be conducted for example, using a double polishing machine with polishing pads of urethane foam and feeding the abrasive of suspended aluminum oxide or colloidal silica. After the polishing process, a heating process may be conducted.

Concerning the suppression of the magnetic domain wall formation in the soft magnetic underlayer of the Co—Ni—P, Co—Ni—W—P, or Co—Ni—Mn—P plating, a ratio Mrrδ/Mrcδ needs to be controlled in a range of 0.33 to 3.00, where MRcδ is a product of thickness and residual magnetization obtained from a magnetization curve measured by applying a magnetic field along a circumferential direction of the disk substrate, and Mrrδ is a product of thickness and residual magnetization obtained from a magnetization curve measured by applying a magnetic field along a radial direction of the disk substrate.

The magnetization tends to align along the circumferential direction of the disk substrate if Mrrδ/Mrcδ is smaller than 0.33, and tends to align along the radial direction of the disk if Mrrδ/Mrcδ is larger than 3.00. µs a result, the magnetic domain walls are liable to be formed along the respective directions, generating undesirable spike noise. Therefore, the ratio Mrrδ/Mrcδ is preferably controlled in a range of 0.33 to 3.00

The Hc value does not correlate strongly to the magnetic domain wall formation, and the read-write performance improves with an Hc value of not larger than about 20 Oe, rather than with the Hc value of not smaller than 30 Oe that is taught by Japanese Unexamined Patent Application Publication No. H2-18710 and Japanese Unexamined Patent Application Publication No. H5-1384.

The magnitude of the ratio Mrrδ/Mrcδ can be controlled by appropriately adjusting the rotating speed of the nonmagnetic base plate in the plating bath and the composition of the plating bath. The Mrrδ/Mrcδ could also be controlled by applying a magnetic field to the nonmagnetic base plate in the plating bath. The application of a homogeneous magnetic field to the substrate in the plating bath is, however, difficult in a practical production process. Further, the process is very liable to impair the mass productivity.

Figure 2:
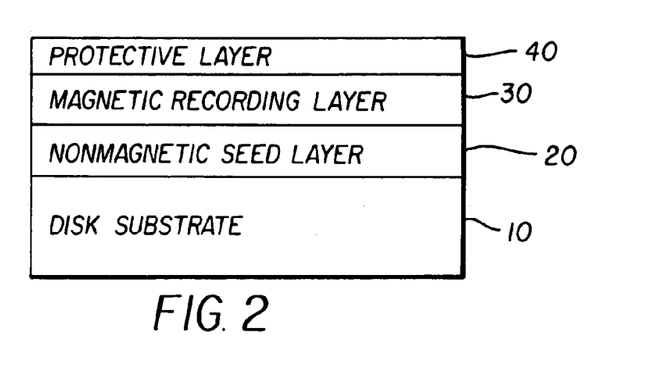
FIG. 2 is a schematic sectional view showing a structure of a perpendicular magnetic recording medium of an embodiment according to the invention.

Embodiment of a medium. FIG. 2 shows a structure of a perpendicular magnetic recording medium of an embodiment of the invention. The perpendicular magnetic recording medium of the embodiment shown in FIG. 2 comprises at least nonmagnetic seed layer 20, magnetic recording layer 30, and protective layer 40 sequentially formed on disk substrate 10 for a perpendicular magnetic recording medium shown in FIG. 1. Though not shown, nonmagnetic seed layer 20, magnetic recording layer 30, and protective layer 40 can also be formed on the other side of disk substrate 10.

Nonmagnetic seed layer 20 can be composed of a material to control the crystal alignment and the grain size of magnetic recording layer 30 favorably, without any special limitation. When magnetic recording layerm 30 is a perpendicular magnetization film composed of a CoCrPt alloy, for example, nonmagnetic seed layer 20 can be composed of a CoCr alloy, titanium or a titanium alloy, or ruthenium or a ruthenium alloy. When magnetic recording layer 30 is a so-called laminated perpendicular magnetization film composed of laminated cobalt alloy layers and platinum or palladium layers, nonmagnetic seed layer 20 can be composed of platinum or palladium. A pre-seed layer or an intermediate layer can be provided on or under nonmagnetic seed layer 20 without obstructing the effects of the invention.

Magnetic recording layer 30 can be composed of any material that allows recording and reproduction in a perpendicular magnetic recording medium. The materials can be selected from the above-mentioned perpendicular magnetization films composed of the CoCrPt alloy, the CoCrPt alloy containing an oxide, or a so-called perpendicular magnetization film comprising layers of a cobalt alloy and platinum or palladium.

Protective layer 40 is a thin film composed mainly of carbon, for example. Protective layer 40 can also be composed of a thin film of mainly carbon and a liquid lubricant layer formed by applying a liquid lubricant such as perfluoropolyether on the carbon thin film.

Nonmagnetic seed layer 20, magnetic recording layer 30, and protective layer 40 can be formed by a thin film formation technique selected from sputtering, CVD, vacuum evaporation, plating, and the like.

A perpendicular magnetic recording medium manufactured as described above has the favorable read-write performance as a double layer perpendicular magnetic recording medium since soft magnetic underlayer 2 in disk substrate 10 (FIG. 1) acts as a soft magnetic backing layer. In addition, the soft magnetic backing layer is formed by an electroless plating method that exhibits high productivity. Therefore, the medium can be manufactured at a very low cost because the backing layer need not be formed by an expensive method of sputtering, for example.

Figure 3:
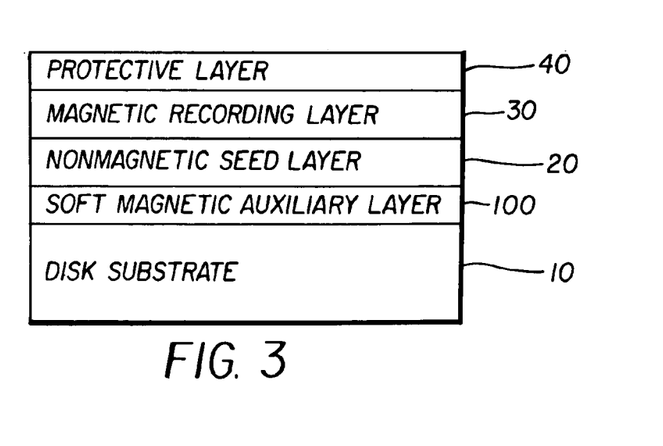
FIG. 3 is a schematic sectional view showing a structure of a perpendicular magnetic recording medium comprising a soft magnetic auxiliary layer of an embodiment according to the invention.

An embodiment of a medium with a soft magnetic auxiliary layer. FIG. 3 shows a structure of a perpendicular magnetic recording medium provided with a soft magnetic auxiliary layer of an embodiment of the invention. The perpendicular magnetic recording medium of the embodiment shown in FIG. 3 comprises at least soft magnetic auxiliary layer 100, nonmagnetic seed layer 20, magnetic recording layer 30, and protective layer 40 sequentially formed on disk substrate 10 for a perpendicular magnetic recording medium shown in FIG. 1. Though not shown, soft magnetic auxiliary layer 100, nonmagnetic seed layer 20, magnetic recording layer 30, and protective layer 40 can also be formed on the other side of substrate 10.

Nonmagnetic seed layer 20, magnetic recording layer 30, and protective layer 40 can be composed of materials similar to the materials used in the perpendicular magnetic recording medium shown in FIG. 2. Soft magnetic auxiliary layer 100 preferably exhibits a product of thickness and saturation magnetic flux density of at least 150 G μm and has a thickness not larger than 50 nm. Examples of the auxiliary layer includes a CoZrNb amorphous soft magnetic layer 15 to 50 nm thick having a saturation magnetic flux density of 10,000 G and a FeTaC soft magnetic layer 10 to 50 nm thick having a saturation magnetic flux density of 15,000 G.

When soft magnetic auxiliary layer 100 is provided, both soft magnetic auxiliary layer 100 and soft magnetic underlayer 2 (FIG. 1) act as soft magnetic backing layers, improving the performance for a double layer perpendicular magnetic recording medium. In addition, an effect is produced to reduce random noises generated in soft magnetic underlayer 2.

Soft magnetic auxiliary layer 100 preferably exhibits a product of thickness and saturation magnetic flux density of at least 150 G μm to improve the performance as a soft magnetic backing layer. The thickness is preferably not larger than 50 nm. If the thickness is greater than 50 nm, magnetic domain walls are apt to be formed in soft magnetic auxiliary layer 100. This generates spike noise, and the productivity also is deteriorated. Thus, such a thickness is unfavorable.

EXAMPLES

Specific examples of the substrates and the media according to the embodiment of the invention will be described in the following. The examples of substrates are disk substrate 10 in FIG. 1 that comprises soft magnetic underlayers 2 provided on the front and back surfaces of nonmagnetic disk-shaped base plate 1. The examples of media comprise the layers, including magnetic recording layer 30, shown in FIG. 2 and FIG. 3 on both surfaces of disk substrate 10.

Example 1

Manufacturing a Substrate Shown in FIG. 1

Nonmagnetic disk-shaped base plate 1 was composed of a strengthened glass substrate manufactured by HOYA Corporation (trade name N5, having a thermal expansion coefficient of $7.1 \times 10^{-6}/°C$.). The surface of the substrate was cleaned by alkali washing and acid etching. To form an initial reaction layer and an adhesion layer between the glass disk and a plating film, the substrate was dipped in a solution of a silane coupling agent of 3-propylamino ethoxysilane and then in a palladium chloride solution.

Subsequently, soft magnetic underlayer 2 of a Co—Ni—P alloy having one of the various thicknesses from 0.5 to 5 μm was formed using a plating bath (1) shown in Table 1. The substrate was rotated in the plating bath at a rotating speed of 10 rpm. The formed soft magnetic underlayers 2 had an average phosphorus concentration of 15 at % and an average cobalt concentration of 71 at % in proportion to the number of atoms of cobalt and nickel (Co/(Co+Ni)).

TABLE 1

Plating bath (1).

| nickel sulfate | 10 g/liter |
|---|---|
| cobalt sulfate | 10 g/liter |
| sodium hypophosphite | 15 g/liter |
| sodium citrate | 60 g/liter |
| boric acid | 30 g/liter |
| pH 8 ± 0.2 (adjusted by | NaOH and $H_2SO_4$) |
| liquid temperature | 80 ± 2° C. |

The surface of soft magnetic underlayer 2 was polished using colloidal silica with a mean grain diameter of 60 nm and a polishing pad of urethane form. The surface roughness Ra was 0.3 nm. Thus, disk substrate 10 for a perpendicular magnetic recording medium as shown in FIG. 1 was manufactured. About 0.5 μm was removed by polishing. The thicknesses of soft magnetic underlayer 2 in the following descriptions are all the values after the polishing process.

Example 2

Manufacturing a Medium of FIG. 2

Disk substrate 10 for a perpendicular magnetic recording medium was cleaned and then the substrate was introduced into a sputtering apparatus. The substrate was heated by a lamp heater for 10 seconds to a surface temperature of 200° C. A nonmagnetic seed layer of titanium with a thickness of 10 nm was deposited on the substrate surface using a titanium target, then a magnetic recording layer of a CoCrPt alloy with a thickness of 30 nm was deposited using a target of $Co_{70}Cr_{20}Pt_{10}$, and finally a protective layer of a carbon protective film 8 nm thick was deposited using a carbon target. The substrate with the deposited layers was removed from the vacuum chamber. All these deposition processes by sputtering were conducted by a DC magnetron sputtering method under an argon gas pressure of 5 mTorr. After that, a liquid lubricant layer 2 nm thick was formed of perfluoropolyether by a dipping method, to produce a perpendicular magnetic recording medium of FIG. 2.

Figure 4:
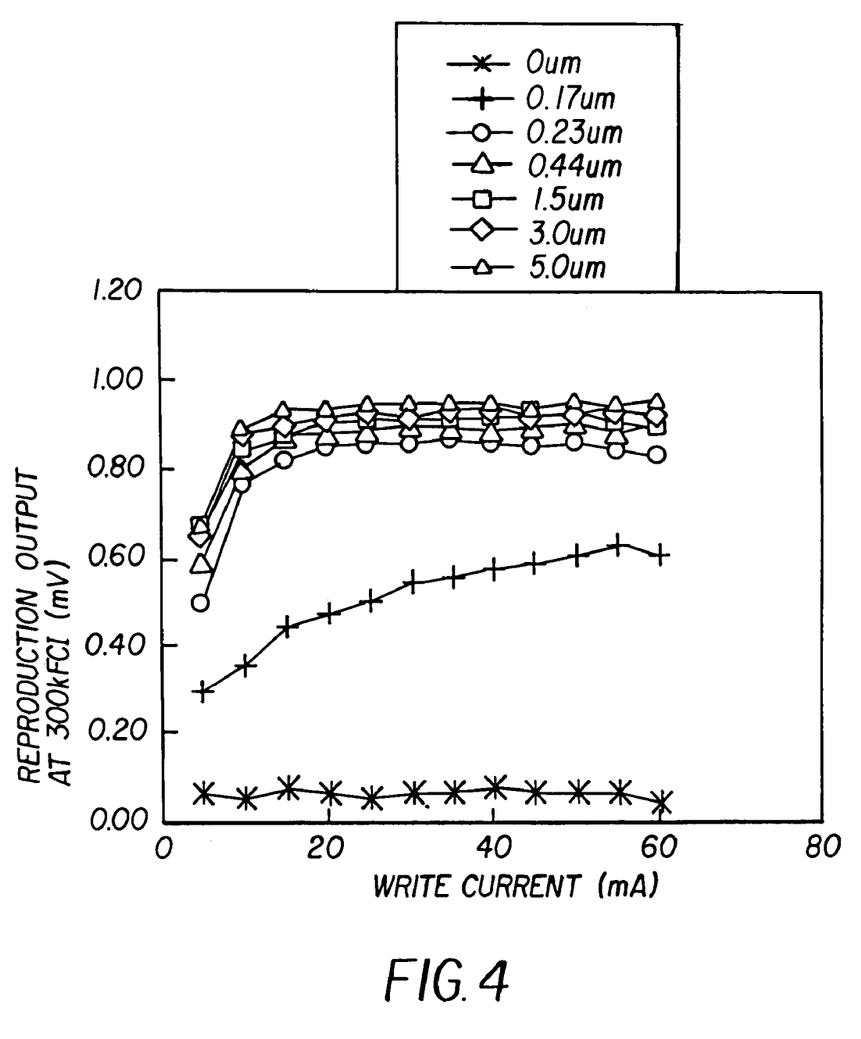
FIG. 4 shows the reproduced output signal, at a recording density of 300 kFCI, of perpendicular magnetic recording media with various film thicknesses of the soft magnetic underlayer in the dependence on the write current in the magnetic head.

The read-write performance was measured on the thus fabricated perpendicular magnetic recording media using a spinning stand tester equipped with a single pole type magnetic head for a perpendicular magnetic recording medium. FIG. 4 shows the dependence of the reproduced output signal at a recording density of 300 kFCI (flux change per inch) on the write current in the magnetic head. When the thickness of the soft magnetic underlayer is zero, that is, the case without a soft magnetic underlayer, the reproduced output is scarcely obtained. When the thickness of the soft magnetic underlayer is thinner than 0.2 μm, the reproduced output is relatively low, and further, not saturated with increase of the write current.

The slow saturation of the reproduced output with increase of the write current requires a large current to obtain high output. Moreover, in the region of unsaturated reproduction output, the variation of the write current produces the large variation of the reproduced output, which is unfavorable in the practical application. In contrast, when the thickness of the soft magnetic underlayer is not smaller than 0.2 μm, a sufficient reproduction output is obtained and the reproduction output is saturated at a low write current, thus, a practically favorable medium is obtained.

Example 2

Examples of the Substrate of FIG. 1 and the Medium of FIG. 2

Disk substrates 10 for a perpendicular magnetic recording medium of FIG. 1 were manufactured in the same manner as in Example 1 except that the thickness of soft magnetic underlayer 2 was 1.5 μm and the average phosphorus concentration in soft magnetic underlayer 2 was varied in the range of 3 at % to 24 at % by varying the conditions of the plating bath in the range shown in the plating bath (2) of Table 2. The average cobalt concentration in soft magnetic underlayer 2 was in the range of 67 at % to 72 at % in proportion to the number of atoms of cobalt and nickel (Co/(Co+Ni)). Then, perpendicular magnetic recording media of FIG. 2 were manufactured as in Example 1.

TABLE 2

Plating bath (2).

| nickel sulfate | 7-12 g/liter |
|---|---|
| cobalt sulfate | 7-12 g/liter |
| sodium hypophosphite | 10-30 g/liter |
| sodium citrate | 20-80 g/liter |
| sodium tartrate | 0-150 g/liter |
| sodium acetate | 0-80 g/liter |
| pH 8 ± 0.2 (adjusted by | NaOH and $H_2SO_4$) |
| liquid temperature | 80 ± 2° C. |

When the phosphorus concentration was less than 3 at %, the plating bath was found very unstable and unacceptable in mass production.

Figure 5:
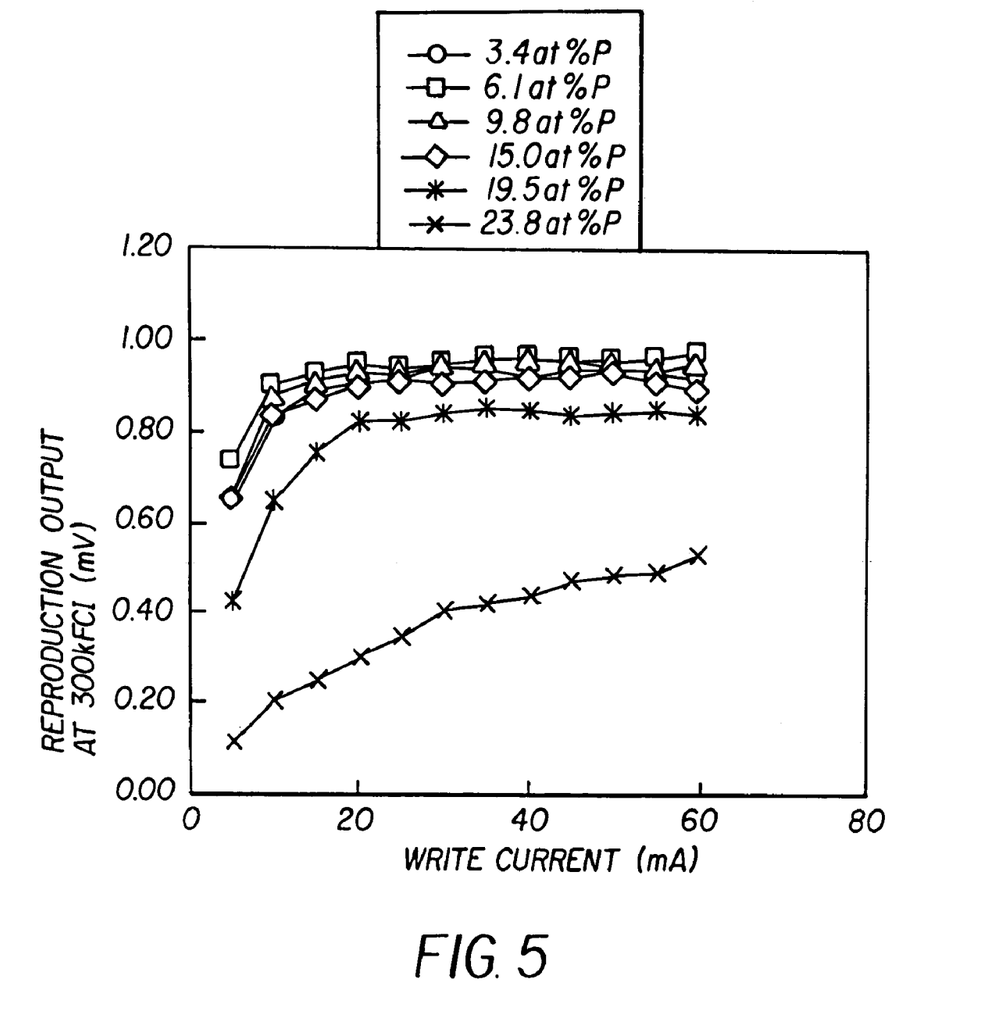
FIG. 5 shows the reproduced output signal, at a recording density of 300 kFCI, of perpendicular magnetic recording media with various mean phosphorus concentration in the soft magnetic underlayer in the dependence on the write current in the magnetic head.

The read-write performance was measured on these media as in Example 1. FIG. 5 shows the dependence of the reproduced output signal at a recording density of 300 kFCI on the write current in the magnetic head. When the average phosphorus concentration in the soft magnetic underlayer was lower than 20 at %, the obtained reproduction output was sufficient, while when it was higher than 22 at %, the reproduced output decreased and the saturation was slower, thus, the performance was insufficient for a soft magnetic backing layer.

Example 3

Examples of the Substrate of FIG. 1 and the Medium of FIG. 2

Disk substrates 10 for a perpendicular magnetic recording medium of FIG. 1 were manufactured in the same manner as in Example 1 except that the thickness of soft magnetic underlayer 2 was 1.5 μm and the average cobalt concentration in soft magnetic underlayer 2 was varied in the range of 17.5 at % to 92.0 at % in proportion to the number of atoms of cobalt and nickel (Co/(Co+Ni)) by varying the conditions of the plating bath in the range shown in the plating bath (3) of Table 3.

In addition, samples for measuring the saturation magnetostriction were fabricated by the same electroless plating on the substrates of a strip of float glass with the dimensions of 20 mm×5 mm×0.15 mm thick. The mean phosphorus concentration in soft magnetic underlayer 2 was in the range of 12 at % to 20 at %. Then, perpendicular magnetic recording media of FIG. 2 were manufactured as in Example 1.

TABLE 3

| Plating bath (3). | |
| --- | --- |
| nickel sulfate | 6-18 g/liter |
| cobalt sulfate | 2-14 g/liter |
| sodium hypophosphite | 10-20 g/liter |
| sodium citrate | 60 g/liter |
| pH 6.5 ± 0.2 to 8 ± 0.2 | (adjusted by NaOH and $H_2SO_4$) |
| liquid temperature | 80 ± 2° C. |

Comparative Example

A comparative example of a disk substrate was manufactured in the same manner as in Example 1 except that a soft magnetic underlayer 2 of a soft magnetic NiP plating layer 1.5 μm thick was formed using a plating bath (4) shown in Table 4. A sample for measuring the saturation magnetostriction was also fabricated as described above. Mean phosphorus concentration in the soft magnetic NiP plating film was 7 at %. A perpendicular magnetic recording medium was also manufactured using this disk substrate as in Example 1.

TABLE 4

| Plating bath (4). | |
| --- | --- |
| nickel sulfate | 25 g/liter |
| sodium hypophosphite | 15 g/liter |
| sodium acetate | 10 g/liter |
| sodium citrate | 15 g/liter |
| pH 6 ± 0.1 | (adjusted by NaOH and $H_2SO_4$) |
| liquid temperature | 90 ± 1° C. |

Figure 6:
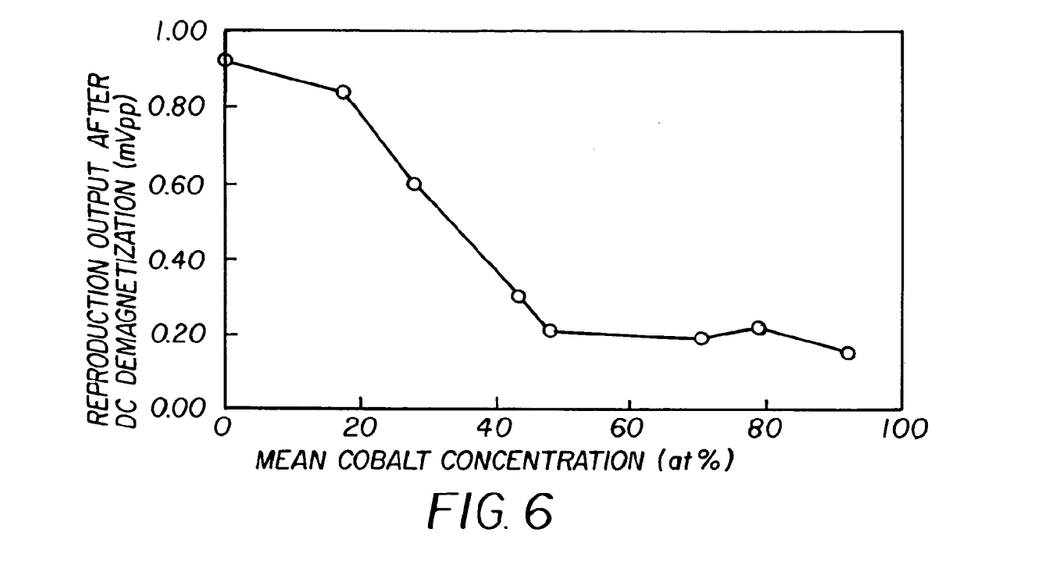
FIG. 6 shows the reproduced output detected after dc demagnetization of the media with a write current of 50 mA represented in a dependence on the mean cobalt concentration in the soft magnetic underlayer in proportion to the number of atoms of cobalt and nickel (Co/(Co+Ni))

The noise generated from the soft magnetic underlayer of these media was measured using a spinning stand tester equipped with a single pole type magnetic head for a perpendicular magnetic recording medium. FIG. 6 shows the reproduced output detected after dc demagnetization of the media with a write current of 50 mA represented in a dependence on the mean cobalt concentration in the soft magnetic underlayer in proportion to the number of atoms of cobalt and nickel (Co/(Co+Ni)).

The reproduced output detected from the medium provided with a soft magnetic NiP plating film fabricated in the Comparative Example is indicated in FIG. 6 as the point at zero at % of the mean cobalt concentration. The reproduction output in this measurement is detected in the condition in which the magnetization in the magnetic recording layer orients in one direction by the dc demagnetization. Consequently, the detected noise can be deemed mostly generated from the soft magnetic underlayer (soft magnetic backing layer).

When the mean cobalt concentration was 43.4 at % and below in proportion to the number of atoms of cobalt and nickel (Co/(Co+Ni)), and in the case of the medium provided with the soft magnetic NiP plating film (mean cobalt concentration of zero at %), very large reproduction output was detected even though in the dc demagnetized condition, and thus it was inadequate for use as a perpendicular magnetic recording medium. When the mean cobalt concentration was 48.2 at % and more in proportion to the number of atoms of cobalt and nickel (Co/(Co+Ni)), the detected reproduction output was small.

Figure 7:
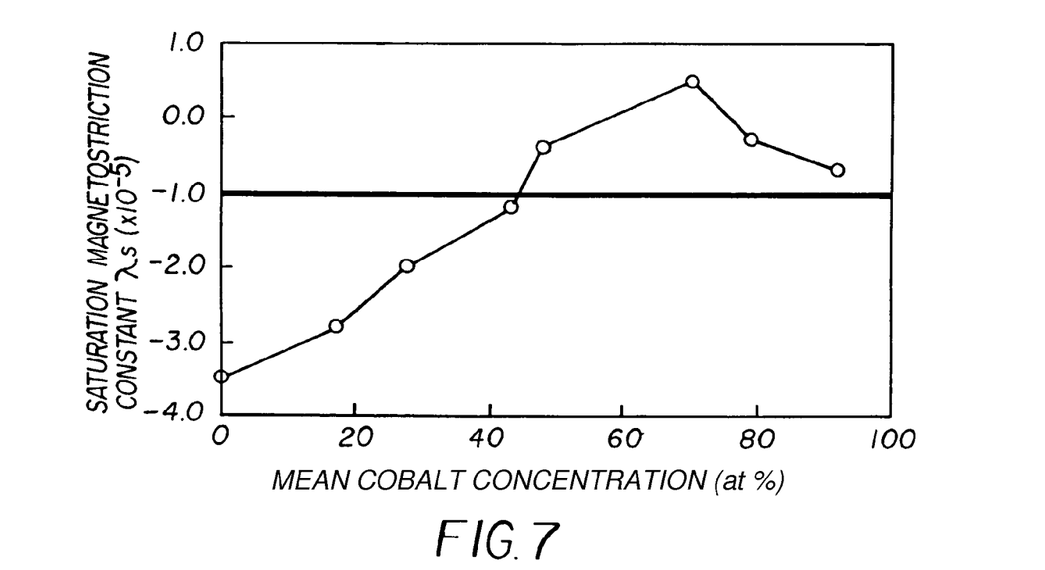
FIG. 7 shows the saturation magnetostriction constant λs represented in a dependence on the mean cobalt concentration in the soft magnetic underlayer in proportion to the number of atoms of cobalt and nickel (Co/(Co+Ni))

Then, the saturation magnetostriction constant $\lambda s$ was measured by means of the cantilever method using the samples for measuring saturation magnetostriction. FIG. 7 shows the saturation magnetostriction constant $\lambda s$ represented in a dependence on the mean cobalt concentration in the soft magnetic underlayer in proportion to the number of atoms of cobalt and nickel (Co/(Co+Ni)). The saturation magnetostriction constant $\lambda s$ measured on the sample provided with a soft magnetic NiP plating film fabricated in the Comparative Example is indicated in FIG. 7 as the point at zero at % of the mean cobalt concentration.

The value of the $\lambda s$ was negative for the soft magnetic NiP plating film (mean cobalt concentration of zero at %) and the absolute value decreased with increase of the mean cobalt concentration. The $\lambda s$ value reaches $-1 \times 10^{-5}$ at the mean cobalt concentration of about 45 at %, and then reaches zero at the mean cobalt concentration of about 50 at %. Afterwards, the $\lambda s$ becomes a positive value.

Comparing FIG. 7 and FIG. 6, it can be noted that noise is large in the region $\lambda s < -1 \times 10^{-5}$, and noise is small in the region $\lambda s \geq -1 \times 10^{-5}$.

Figure 8:
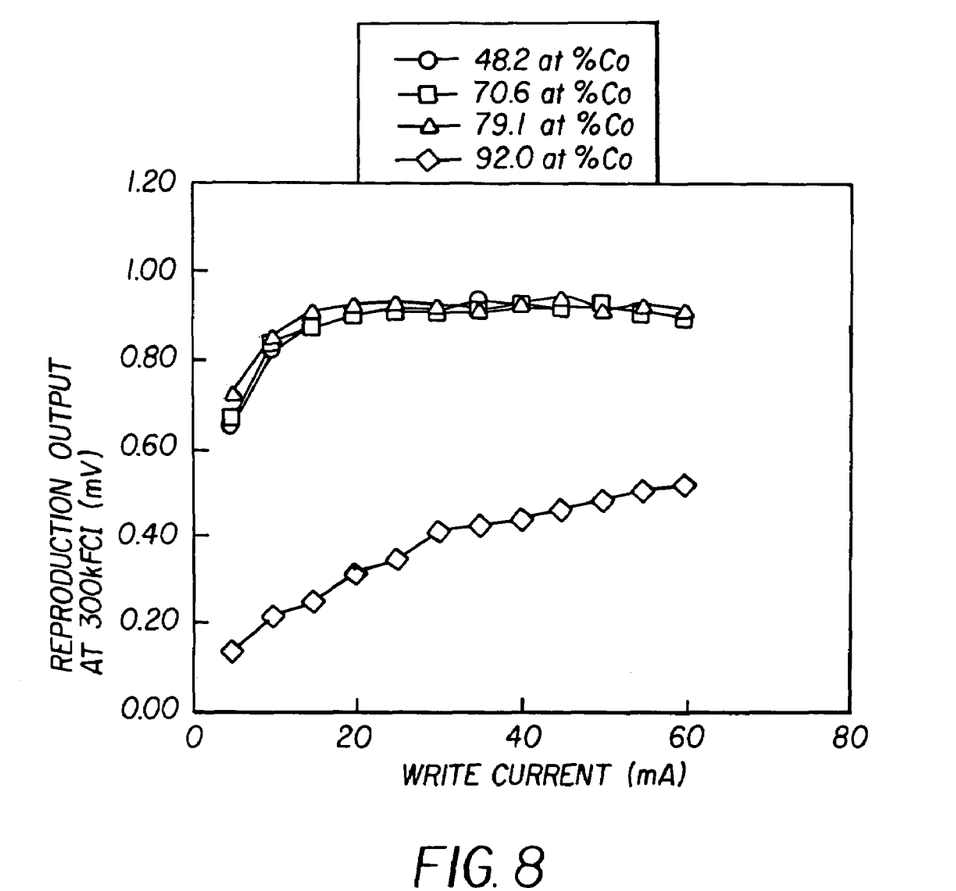
FIG. 8 shows the reproduced output signal, at a recording density of 300 kFCI, of perpendicular magnetic recording media with various mean cobalt concentration in the soft magnetic underlayer in proportion to the number of atoms of cobalt and nickel (Co/(Co+Ni)) in the dependence on the write current in the magnetic head.

The read-write characteristics were measured as in Example 1 on the media having the mean cobalt concentration of 48.2 at % and larger in proportion to the number of atoms of cobalt and nickel (Co/(Co+Ni)), those media exhibiting small reproduced output in the above-described measurement in the dc demagnetized condition. FIG. 8 shows the reproduced output signal at a recording density of 300 kFCI in the dependence on the write current in the magnetic head. High reproduced output signal and fast saturation of the reproduced output were obtained in the media comprising a soft magnetic underlayer having the mean cobalt concentration in the range of 48.2 at % to 79.1 at % in proportion to the number of atoms of cobalt and nickel (Co/(Co+Ni)).

On the other hand, when the mean cobalt concentration was 92.0 at % in proportion to the number of atoms of cobalt and nickel (Co/(Co+Ni)), the reproduced output decreased and the saturation went down. Thus, insufficient function as a soft magnetic backing layer was suggested.

Example 4

Examples of Substrates of FIG. 1 and Media of FIG. 2

Disk substrates 10 for a perpendicular magnetic recording medium of FIG. 1 were manufactured in the same manner as in Example 1 except that the thickness of soft magnetic underlayer 2 was 1.5 μm, and the deposition speed of soft magnetic underlayer 2 by a plating process was varied by changing the rotating speed of the substrate in the plating bath in the range from zero to 20 rpm, and changing the plating bath temperature. The average phosphorus concentration in the soft magnetic underlayer was in the range of 10 at % to 20 at %, and the average cobalt concentration was in the range of 67 at % to 72 at % in proportion to the number of atoms of cobalt and nickel (Co/(Co+Ni)).

Figure 9A:
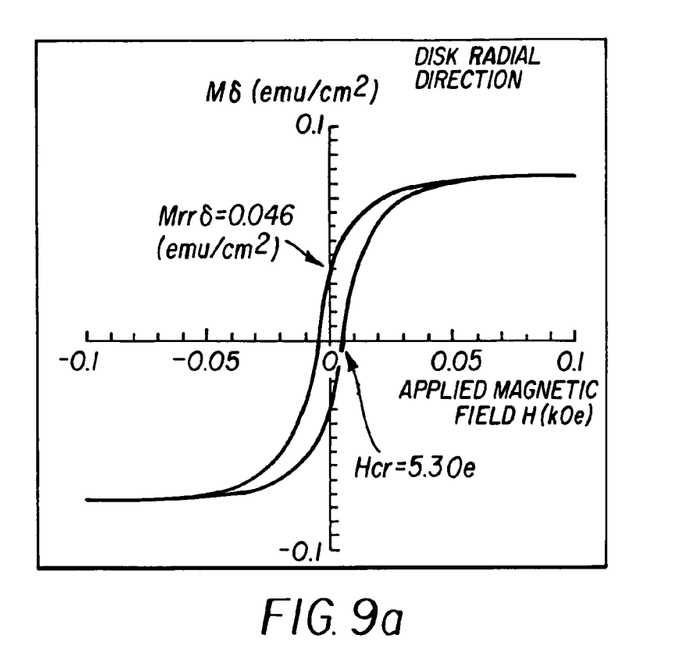
FIG. 9 shows typical magnetization curves and the definitions of the residual magnetization and the coercivity of a soft magnetic underlayer, in which (a) shows the ones along the radial direction of the disk, and (b) shows the ones along the circumferential direction of the disk.
Figure 9B:
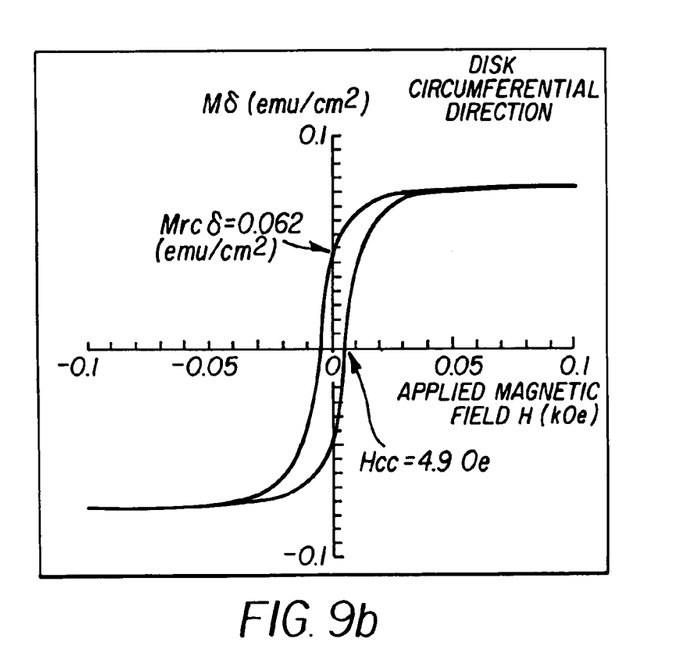

After cutting the substrate into 8 mm squares and removing the plating film on one side of the substrate by polishing, the magnetization curves were measured in the disk radial direction and the disk circumferential direction using a vibrating sample magnetometer (VSM) to obtain the residual magnetizations Mrr and Mrc, and the coercivities Hcr and Hcc. FIG. 9 shows a typical magnetization curve and the definitions of the residual magnetization and the coercivity. The values of Mrrδ/Mrcδ of the produced soft magnetic underlayer were in the range of 0.05 to 12.

Using the uncut disk substrates, perpendicular magnetic recording media as shown in FIG. 2 were manufactured in the same manner as in Example 1. On these perpendicular magnetic recording media, the spike noise was measured using a spinning stand tester equipped with a single magnetic pole type magnetic head for a perpendicular magnetic recording medium. In the first of the measurements, direct current demagnetization of the perpendicular magnetic recording medium was carried out by supplying the writing element of the magnetic head with a dc current of 50 mA. Then, the current in the writing element was decreased to zero and the signal generated in the perpendicular magnetic recording medium was read out without writing-in.

Table 5 shows the occurrence of spike noise in each perpendicular magnetic recording medium, and the value of Mrrδ/Mrcδ and mean value Hc of Hcr and Hcc obtained from the magnetization curve for the corresponding substrate.

TABLE 5

| Mrrδ/Mrcδ | Hc (Oe) | spike noise |
|---|---|---|
| 0.005 | 4 | X |
| 0.14 | 3 | X |
| 0.27 | 5 | X |
| 0.31 | 8 | □ |
| 0.38 | 8 | ○ |
| 0.5 | 18 | ○ |
| 1.3 | 12 | ○ |
| 2.2 | 8 | ○ |
| 2.9 | 7 | ○ |
| 3.1 | 9 | X |
| 7 | 4 | X |
| 85 | 3 | X |

Symbols X, ○, and □ respectively indicate that spike noise was generated, no spike noise was generated, and very little spike noise was generated.

The perpendicular magnetic recording medium exhibiting the value Mrrδ/Mrcδ of in the range of 0.33 to 3.0 generated no spike noise. The Hc value of the media that did not generate spike noise was not more than 20 Oe.

Example 5

Examples of the Substrates of FIG. 1 and the Media of FIG. 3

Disk substrates 10 for a perpendicular magnetic recording medium of FIG. 1 were manufactured in the same manner as in Example 1 except that the thickness of the soft magnetic underlayer 2 was 1.5 μm. The value of Mrrδ/Mrcδ of this substrate was 1.5, which was measured using a VSM by the method described in Example 4.

After cleaning, each of disk substrates 10 for perpendicular magnetic recording medium was introduced into a sputtering apparatus. Soft magnetic auxiliary layers 100 of a NiFe alloy having a thickness of in the range of 0 to 100 nm were formed using a target of $Ni_{80}Fe_{20}$. Subsequent processes from substrate heating were conducted in the same manner as in Example 1, to produce perpendicular magnetic recording media as shown in FIG. 3. The saturation magnetic flux density of the thus formed soft magnetic auxiliary layers 100 was 10,000 G.

Figure 10:
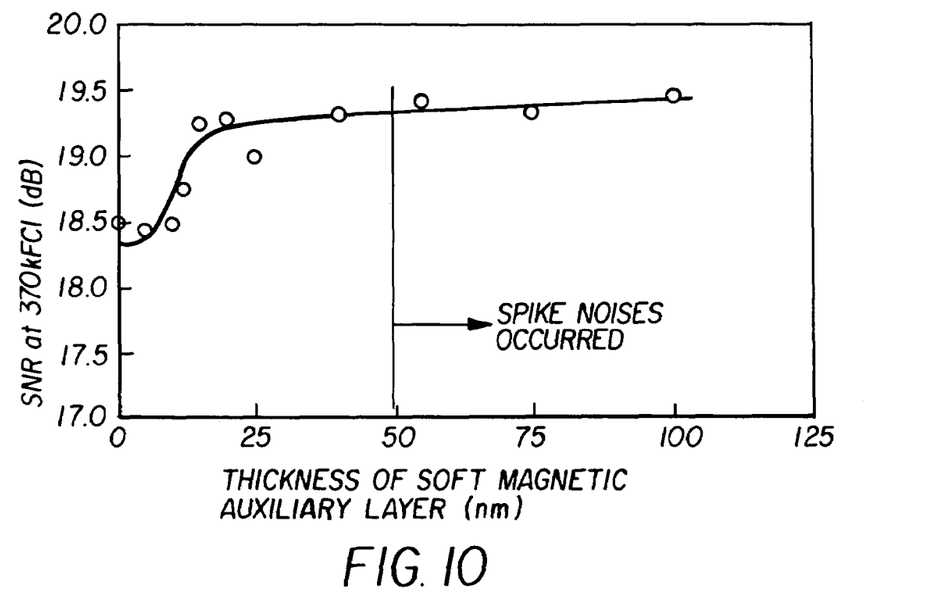
FIG. 10 shows the signal-to-noise ratio SNR at a recording density of 370 kFCI in the dependence on the thickness of the soft magnetic auxiliary layer.

On these perpendicular magnetic recording media, spike noise was measured using a spinning stand tester equipped with a single magnetic pole type magnetic head for a perpendicular magnetic recording medium. FIG. 10 shows the signal-to-noise ratio SNR at a recording density of 370 kFCI (flux change per inch) in the dependence on the thickness of the soft magnetic auxiliary layer. The effect of SNR improvement was unsatisfactory when the thickness of the soft magnetic auxiliary layer was thinner than 15 nm, which is equivalent to the product of the thickness and the saturation magnetic flux density less than 150 G μm. Forming a soft magnetic auxiliary layer of at least 15 nm thickness improves SNR by 0.5 dB to 1 dB in comparison with the case without the soft magnetic auxiliary layer.

While the SNR is practically constant in the range of the thickness of 15 nm or more, the media provided with a soft magnetic auxiliary layer thicker than 50 nm caused the detection of spike noise that can be attributed to the soft magnetic auxiliary layer, and found inappropriate for a perpendicular magnetic recording medium.

Example 6

Examples of the Substrate of FIG. 1 and the Medium of FIG. 2

Disk substrates 10 for a perpendicular magnetic recording medium of FIG. 1 were manufactured in the same manner as in Example 1 except that the conditions of the plating bath were as shown in the plating bath (5) of Table 6. In addition, samples for measuring the saturation magnetostriction were fabricated by the same electroless plating method on the substrates of a strip of float glass with the dimensions of 20 mm×5 mm×0.15 mm thick.

The mean cobalt concentration in soft magnetic underlayer 2 was in the range of 68 at % to 72 at % in proportion to the number of atoms of cobalt and nickel (Co/(Co+Ni)), and the mean phosphorus concentration was in the range of 5 at % to 13 at %. The mean tungsten concentration was in the range of 0.1 at% to 2 at %. The mean tungsten concentration increased no more than the uppermost value of 2 at % even with an increase in the quantity of sodium tungstate in the plating bath.

TABLE 6

| Plating bath (5). | |
|---|---|
| sodium tungstate | 1.6-8.2 g/liter |
| nickel sulfate | 5 g/liter |
| cobalt sulfate | 5 g/liter |
| sodium hypophosphite | 20 g/liter |
| sodium citrate | 60 g/liter |
| boric acid | 30 g/liter |
| pH 8 ± 0.2 | (adjusted by NaOH and $H_2SO_4$) |
| liquid temperature | 80 ± 0.2° C. |

Perpendicular magnetic recording media of FIG. 2 were manufactured as in Example 1 using the fabricated samples of the disk substrates for a perpendicular magnetic recording medium. One sheet of the sample of the perpendicular magnetic recording medium was left in an atmosphere at a temperature of 80° C. and a relative humidity of 85% for 96 hours. After that, the sample of the perpendicular magnetic recording medium was dipped in 50 ml of ultra high purity water. After pure water extraction by a shaker for 3 minutes, an ICP-MS measurement was conducted using ELAN-DRCII (a product of PerkinElmer, Inc.).

Figure 11:
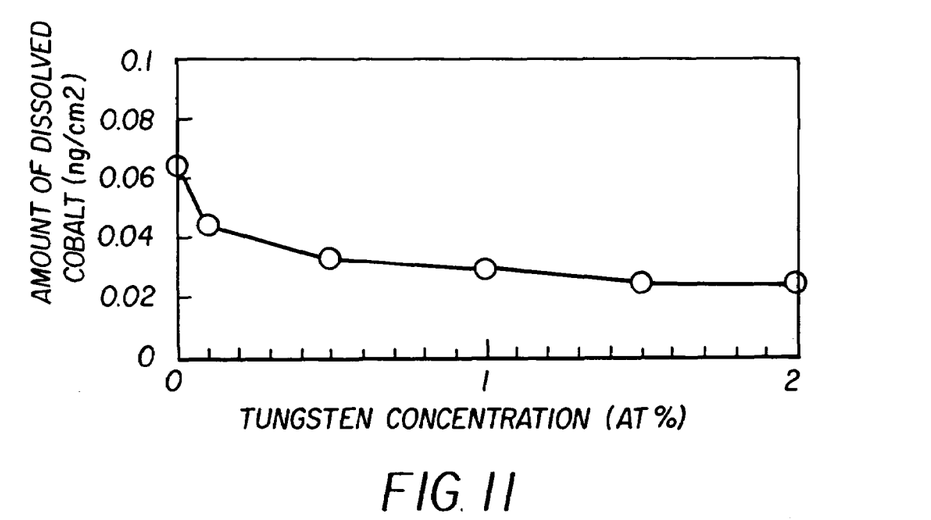
FIG. 11 shows the dependence of the amount of dissolved cobalt on the tungsten concentration in atomic percent.

FIG. 11 shows the measurement result of the amount of dissolved cobalt. The amount of dissolved cobalt decreases by adding at most 2 at % of tungsten. It has been demonstrated that soft magnetic underlayer 2 of a Co—Ni—W—P alloy containing at most 2 at % of tungsten improves the corrosion resistance as compared with an underlayer 2 of a Co—Ni—P alloy without tungsten.

The saturation magnetostriction constant μs was measured on the sample for measuring the saturation magnetostriction by a cantilever method, and resulted in the value of the saturation magnetostriction constant in the range $\lambda s \geqq -1 \times 10^{-5}$.

Example 7

Examples of the Substrate of FIG. 1 and the Medium of FIG. 2

Disk substrates 10 for a perpendicular magnetic recording medium of FIG. 1 were manufactured in the same manner as in Example 1 except that the conditions of the plating bath were as shown in the plating bath (6) of Table 7. The mean cobalt concentration in soft magnetic underlayer 2 was in the range of 55 at % to 60 at % in proportion to the number of atoms of cobalt and nickel (Co/(Co+Ni)), and the mean phosphorus concentration was in the range of 8 at % to 13 at %. The mean manganese concentration was in the range of 0.3 at % to 2 at %. Inclusion of more than 2 at % of manganese made the film surface coarse, and thus was undesirable.

TABLE 7

| Plating bath (6). | |
|---|---|
| manganese sulfate | 6-12 g/liter |
| nickel sulfate | 10 g/liter |
| cobalt sulfate | 10 g/liter |
| sodium hypophosphite | 40 g/liter |
| sodium citrate | 60 g/liter |
| boric acid | 30 g/liter |
| pH 8 ± 0.2 | (adjusted by NaOH and $H_2SO_4$) |
| liquid temperature | 80 ± 2° C. |

Figure 12:
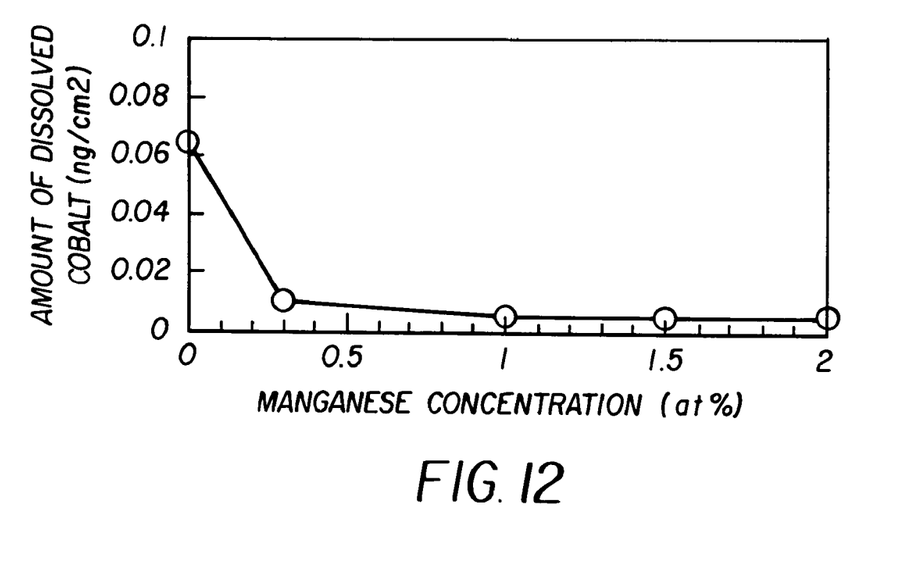
FIG. 12 shows the dependence of the amount of dissolved manganese on the tungsten concentration in atomic percent.

Perpendicular magnetic recording media of FIG. 2 were manufactured as in Example 1 using the fabricated samples of the disk substrates for a perpendicular magnetic recording medium. FIG. 12 shows the amount of dissolved cobalt measured by the same method as in Example 6. The amount of dissolved cobalt decreases by adding at most 2 at % of manganese. It has been demonstrated that soft magnetic underlayer 2 of a Co—Ni—Mn—P alloy containing at most 2 at % of manganese improves the corrosion resistance as compared with an underlayer 2 of a Co—Ni—P alloy without manganese.

Thus, a disk substrate for a perpendicular magnetic recording medium and a medium based on the disk substrate have been described according to the present invention. Many modifications and variations may be made to the techniques and structures described and illustrated herein without departing from the spirit and scope of the invention. Accordingly, it should be understood that the methods and devices described herein are illustrative only and are not limiting upon the scope of the invention.

What is claimed is:

1. A disk substrate for a perpendicular magnetic recording medium comprising a soft magnetic underlayer formed on a nonmagnetic disk-shaped base plate by means of an electroless plating method, wherein a thermal expansion coefficient of the soft magnetic underlayer is larger than a thermal expansion coefficient of the nonmagnetic disk-shaped base plate and a saturation magnetostriction constant As satisfies a relation $As \geqq -1 \times 10^{-5}$, wherein the soft magnetic underlayer exhibits a ratio Mrrδ/Mrcδ is in a range of 0.33 to 3.00, in which Mrrδ is a product of the thickness and residual magnetization obtained from a magnetization curve measured by applying a magnetic field along a circumferential direction of the disk substrate, and Mrrδ is a product of the thickness and residual magnetization obtained from a magnetization curve measured by applying a magnetic field along a radial direction of the disk substrate.

2. The disk substrate for a perpendicular magnetic recording medium according to claim 1, wherein the nonmagnetic disk-shaped base plate comprises chemically reinforced glass or crystallized glass.

3. The disk substrate for a perpendicular magnetic recording medium according to claim 1, wherein the soft magnetic underlayer comprises a Co—Ni—P alloy that contains phosphorus in a range of 3 at % to 20 at % and cobalt in an amount of at least 45 at % in proportion to the number of atoms of cobalt and nickel (Co/(C+Ni>>, and wherein thickness of the soft magnetic underlayer is in a range of 0.2 μm to 3 μm.

4. The disk substrate for a perpendicular magnetic recording medium according to claim 3, wherein the soft magnetic underlayer additionally comprises tungsten or manganese in an amount of at most 2 at %.

5. A perpendicular magnetic recording medium comprising a disk substrate for a perpendicular magnetic recording medium according to claim 1, and at least a nonmagnetic seed layer, a magnetic recording layer, and a protective layer sequentially formed on the substrate, wherein the soft magnetic underlayer of the substrate is utilized as at least a part of a soft magnetic backing layer for the magnetic recording layer.

6. The perpendicular magnetic recording medium according to claim 5, additionally comprising at least a soft magnetic auxiliary layer, having a thickness of at most 50 nm and exhibiting a product of the thickness and a saturation magnetic flux density of at least 150 G μm, disposed between the soft magnetic underlayer and the nonmagnetic seed layer.

* * * * *

UNITED STATES PATENT AND TRADEMARK OFFICE
CERTIFICATE OF CORRECTION

PATENT NO. : 7,622,205 B2
APPLICATION NO. : 11/104274
DATED : November 24, 2009
INVENTOR(S) : Hiroyuki Uwazumi et al.

It is certified that error appears in the above-identified patent and that said Letters Patent is hereby corrected as shown below:

Claim 1; Column 18, Line 14:   REMOVE: "Mrr $\delta$"

TO READ: -- Mrc $\delta$ --

Claim 3; Column 18, Line 30:   REMOVE: "(Co/(C+Ni>>"

TO READ: -- (Co/(Co+Ni)) --

Signed and Sealed this

Third Day of August, 2010

David J. Kappos
*Director of the United States Patent and Trademark Office*